(12) United States Patent
Barbier (10) Patent No.: US 12,157,541 B2
(45) Date of Patent: Dec. 3, 2024

(54) MULTI PURPOSE ELECTRIC HYDROFOIL

(71) Applicant: Renaud Barbier, Dubai (AE)

(72) Inventor: Renaud Barbier, Dubai (AE)

(73) Assignee: Renaud Barbier, Dubai (AE)

( * ) Notice: Subject to any disclaimer, the term of this patent is extended or adjusted under 35 U.S.C. 154(b) by 489 days.

(21) Appl. No.: 17/710,580

(22) Filed: Mar. 31, 2022

(65) Prior Publication Data

US 2023/0312061 A1  Oct. 5, 2023

(51) Int. Cl.
  *B63B 32/60*   (2020.01)
  *B60L 50/64*   (2019.01)
  *B63B 1/24*    (2020.01)
  *B63B 79/40*   (2020.01)
  *B63H 21/17*   (2006.01)
  *B63H 21/21*   (2006.01)
  *G05D 1/00*    (2006.01)

(52) U.S. Cl.
  CPC .............. *B63B 32/60* (2020.02); *B60L 50/64* (2019.02); *B63B 1/242* (2013.01); *B63B 1/246* (2013.01); *B63B 79/40* (2020.01); *B63H 21/17* (2013.01); *B63H 21/21* (2013.01); *G05D 1/0022* (2013.01); *B63H 2021/216* (2013.01)

(58) Field of Classification Search
  None
  See application file for complete search history.

(56) References Cited

FOREIGN PATENT DOCUMENTS

| CA | 3103526 A1 | * | 7/2021 | ............. | B63B 1/246 |
| CN | 111699131 A | * | 9/2020 | ............. | B63B 1/246 |
| WO | WO-2020212664 A1 | * | 10/2020 | ............. | B63B 32/10 |

* cited by examiner

*Primary Examiner* — S. Joseph Morano
*Assistant Examiner* — Jovon E Hayes (57) ABSTRACT

A hydrofoil assembly adapted to be attached to a watercraft includes a mast having a mast head adapted to be removably engage with the watercraft and disposed exterior to the watercraft. The hydrofoil assembly also includes a propulsion assembly coupled to the mast and including a propeller and an electric motor for rotating the propeller. The hydrofoil assembly also includes at least one wing coupled to the mas. Moreover, the hydrofoil assembly includes a battery coupled to the mast head and adapted to be arranged exterior to the watercraft.

20 Claims, 10 Drawing Sheets

MULTI PURPOSE ELECTRIC HYDROFOIL

TECHNICAL FIELD

The present disclosure pertains to an electric personal watercraft assembly. More particularly, the present disclosure pertains to a hydrofoil assembly having a battery and adapted to be removably attached to a personal watercraft.

BACKGROUND

In recent years, watercrafts or surfboards are installed with hydrofoils facilitating the lifting of the watercraft/surfboard above the water surface to provide the rider/user enhanced ride feeling and providing the watercraft/surfboard improved power efficiency. Typically, the hydrofoil system includes a battery system to facilitate the supply of electrical power and is typically arranged inside the board to position the battery away from the water. However, water sports enthusiast prefers a plurality of boards according to different situations, and positioning of the battery inside the board makes the replacement of boards difficult.

SUMMARY

According to an aspect of the disclosure a hydrofoil assembly adapted to be attached to a personal watercraft is disclosed. The hydrofoil assembly includes a mast having a mast head adapted to be removably engage with the personal watercraft and disposed exterior to the personal watercraft. The hydrofoil assembly also includes a propulsion assembly coupled to the mast and including a propeller and an electric motor operatively coupled to the propeller for rotating the propeller. The hydrofoil assembly also includes at least one wing coupled to the mast and arranged distally from the mast head. Moreover, the hydrofoil assembly includes a battery disposed exterior of the mast head and adapted to be arranged exterior of the personal watercraft in an assembly of the mast head with the personal watercraft. The battery is coupled to and supported on the mast head and provides electrical power to the electric motor.

In some embodiments, the mast head includes a plurality of engagement structures, and the battery includes a plurality of retention structures removably engaged with the plurality of engagement structures to facilitate a removable coupling of the battery and the mast head.

In some embodiments, each engagement structure includes a tab extending outwardly from a side surface of the mast head, and each retention structure includes a lock structure to receive the tab and lock the tab with the battery.

In some embodiments, the tab includes an arm structure having a first end engaged to the mast head and a second end disposed outwardly of the side surface of the mast head, and a hook structure arranged at the second end of the arm structure.

In some embodiments, the lock structure includes a recess defined by a second surface of the battery and a stopper structure covering a portion of the recess. In the engagement of the tab with the lock structure, the hook structure is arranged inside the recess and engaged with the stopper structure such that a portion of the hook structure is arranged underneath the stopper structure.

In some embodiments, the mast head includes a plurality of connectors, and the battery includes a plurality of couplers adapted to engage with the plurality of connectors to electrically couple the battery with the electric motor.

In some embodiments, each connector includes a connector port and a socket extending through the connector port and arranged coaxially with the connector port defining a gap therebetween.

In some embodiments, each coupler includes a pin extending outwardly of the battery and a cover arranged circularly around the pin defining a space therebetween. The pin extends inside the socket and the cover is arranged inside the gap in an assembly of the battery with the mast head.

In some embodiments, the battery defines a cut-out extending from the first surface of the battery to a second surface of the battery arranged opposite to the first surface of the battery. The mast head is arranged, at least partially, inside the cut-out.

In some embodiments, the hydrofoil assembly further includes a controller adapted to control the electric motor, and a transceiver adapted to facilitate a communication of the controller with a remote input device at a sub gigahertz frequency.

According to another aspect of the disclosure a watercraft assembly is provided. The watercraft assembly includes a personal watercraft having a first surface adapted to support at least one user and a second surface arranged opposite to the first surface. The watercraft assembly also includes a hydrofoil assembly removably engaged to the personal watercraft and arranged exterior to and underneath the personal watercraft. The hydrofoil assembly includes a mast having a mast head removably engaged with the personal watercraft and disposed exterior to the watercraft. The mast head includes a first surface arranged facing the personal watercraft. The hydrofoil assembly also includes a propulsion assembly coupled to the mast and including a propeller and an electric motor operatively coupled to the propeller for rotating the propeller. The hydrofoil assembly further includes at least one wing coupled to the mast and arranged distally from the mast head. Moreover, the hydrofoil assembly includes a battery coupled to and supported on the mast head. The battery is arranged exterior to the personal watercraft and provides electric power to the electric motor.

In some embodiments, the mast head includes a second surface arranged opposite to the first surface of the mast head, and the battery is engaged with the mast head such that a first surface of the battery is arranged flush with the first surface of the mast head.

In some embodiments, the mast head includes a plurality of engagement structures, and the battery includes a plurality of retention structures removably engaged with the plurality of engagement structures to facilitate a removable coupling of the battery and the mast head.

In some embodiments, each engagement structure includes a tab extending outwardly from a side surface of the mast head, and each retention structure includes a lock structure to receive the tab and lock the tab with the battery.

In some embodiments, the tab includes an arm structure extending outwardly from the mast head and a hook structure extending from the arm structure. The lock structure includes a recess defined by a second surface of the battery and a stopper structure covering a portion of the recess. In the engagement of the tab with the lock structure, the hook structure is arranged inside the recess and engaged with the stopper structure such that a portion of the hook structure is arranged underneath the stopper structure.

In some embodiments, the mast head includes a plurality of connectors, and the battery includes a plurality of couplers adapted to engage with the plurality of connectors to electrically couple the battery with the electric motor.

In some embodiments, each connector includes a connector port and a socket extending through the connector port and arranged coaxially with the connector port defining a gap therebetween.

In some embodiments, each coupler includes a pin extending outwardly of the battery and a cover arranged circularly around the pin defining a space therebetween. The pin extends inside the socket and the cover is arranged inside the gap in an assembly of the battery with the mast head.

In some embodiments, the battery includes a first surface and a second surface arranged opposite to the first surface. The battery defines a cut-out extending from the first surface of the battery to the second surface of the battery. The mast head is arranged, at least partially, inside the cut-out.

In some embodiments, wherein the hydrofoil assembly includes a controller adapted to control the electric motor, and a transceiver adapted to facilitate a communication of the controller with a remote input device at a sub gigahertz frequency.

DETAILED DESCRIPTION

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

For the purposes of the present disclosure, at least one of A, B, or C includes, for example, A only, B only, or C only, as well as A and B, A and C, B and C; or A, B, and C, or any other all combinations of A, B, and C.

For the purposes of the present disclosure, one of A or B includes, for example, A only, B only.

For the purposes of the present disclosure, one of A and B includes, for example, A only, B only.

Figure 1:
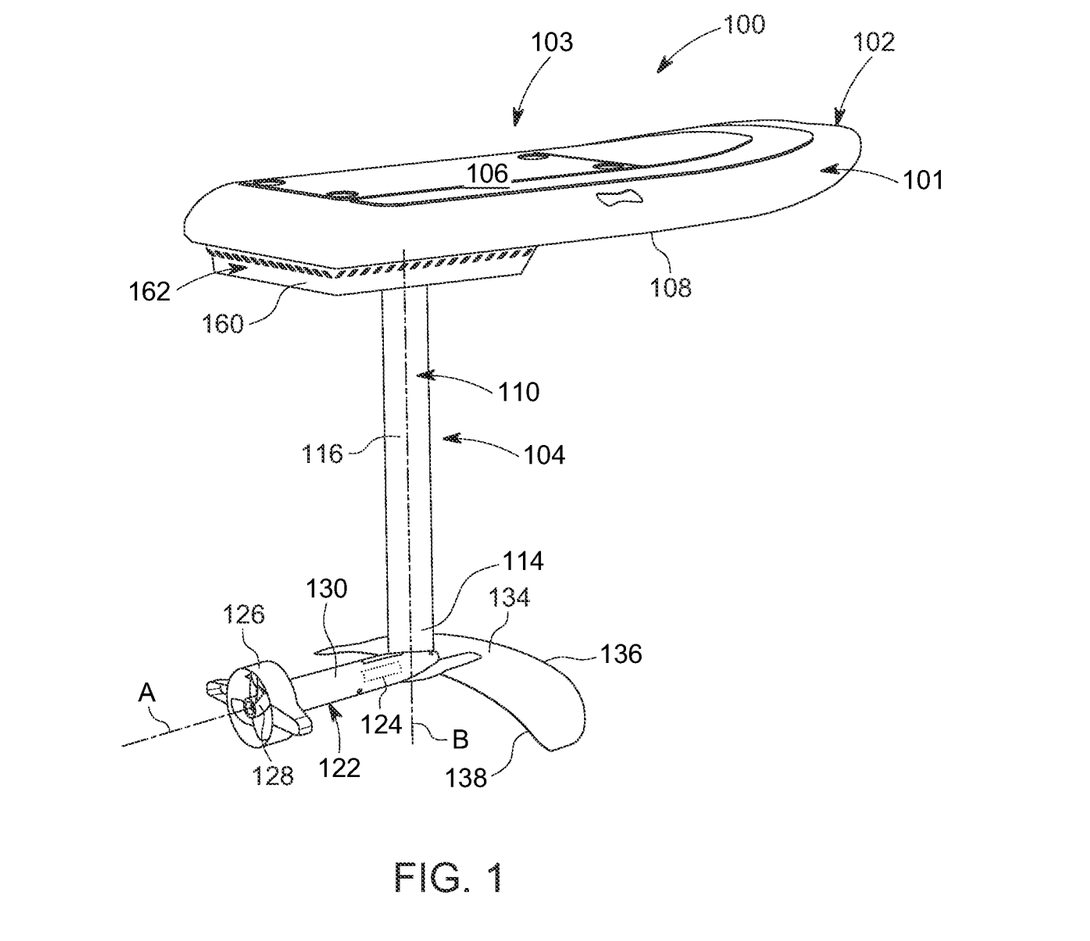
FIG. 1 illustrates a perspective view of a watercraft assembly having a personal watercraft and a hydrofoil assembly attached to the watercraft, in accordance with an embodiment of the disclosure.
Figure 2:
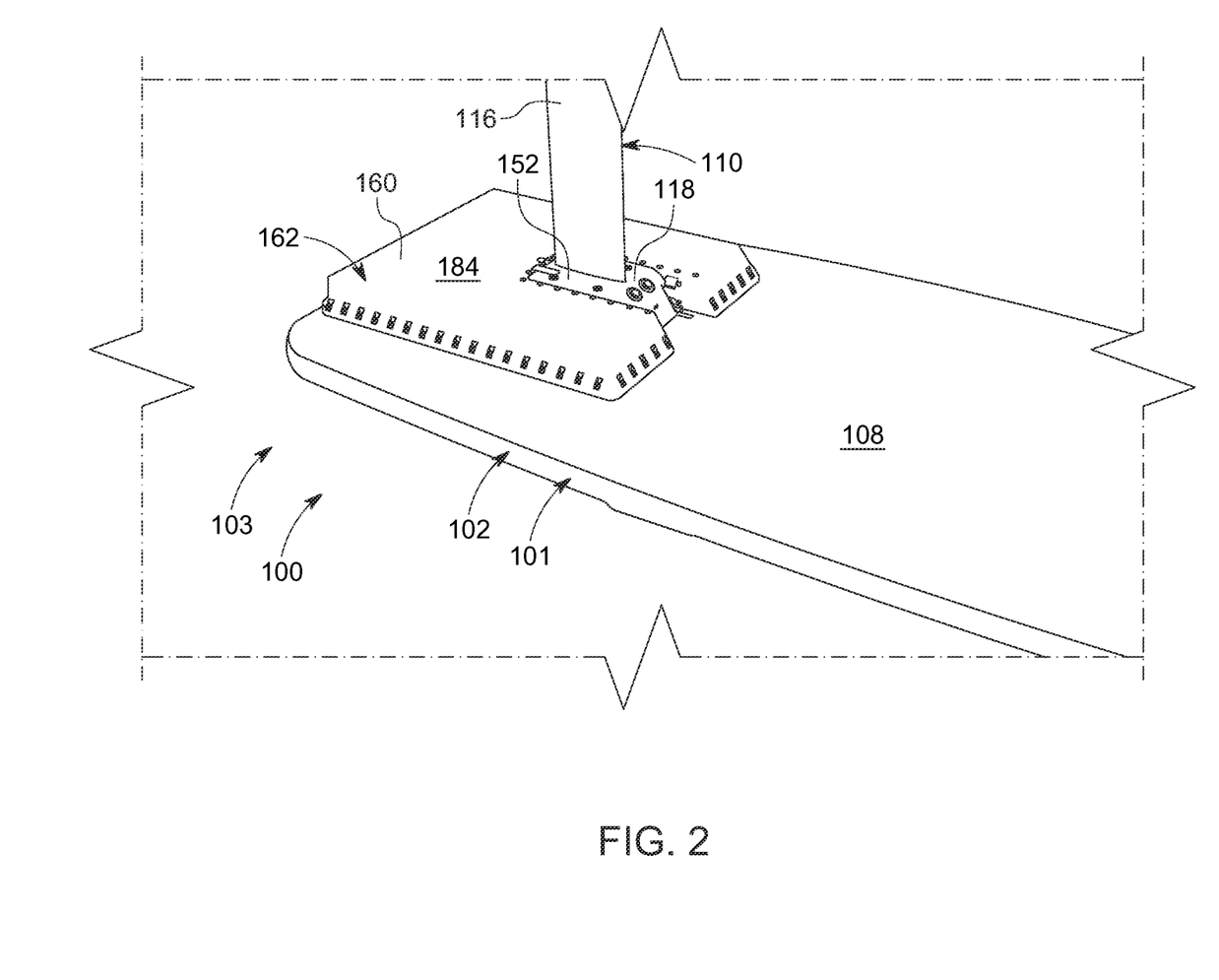
FIG. 2 illustrates bottom perspective view of a portion of the watercraft assembly of FIG. 1, in accordance with an embodiment of the disclosure.

Referring to FIG. 1 and FIG. 2, a personal watercraft assembly 100 (hereinafter referred to as watercraft assembly 100) having a watercraft 101 and a hydrofoil assembly 104 removably engaged to the watercraft 101 and arranged underneath the watercraft 101 is shown. Although the watercraft assembly 100 is shown and contemplated as a surfboard assembly 103 having the watercraft 101 as a surfboard 102, it may be envisioned that watercraft assembly 100 may include other personal watercrafts, for example, a jet-ski, a small boat, or any other such watercraft that facilitates floating on water and is suitable to support a small number of people. As shown, the surfboard 102 includes a first surface 106 (i.e., upper surface 106) which supports a user while surfing on the water, and a second surface 108 (i.e., lower surface 108), best shown in FIG. 2, arranged opposite to the first surface 106 to which the hydrofoil assembly is attached. The surfboard 102 may include a shape and structure that facilitates a floating of the surfboard 102 on the water and enables surfing the water by the user.

Figure 3:
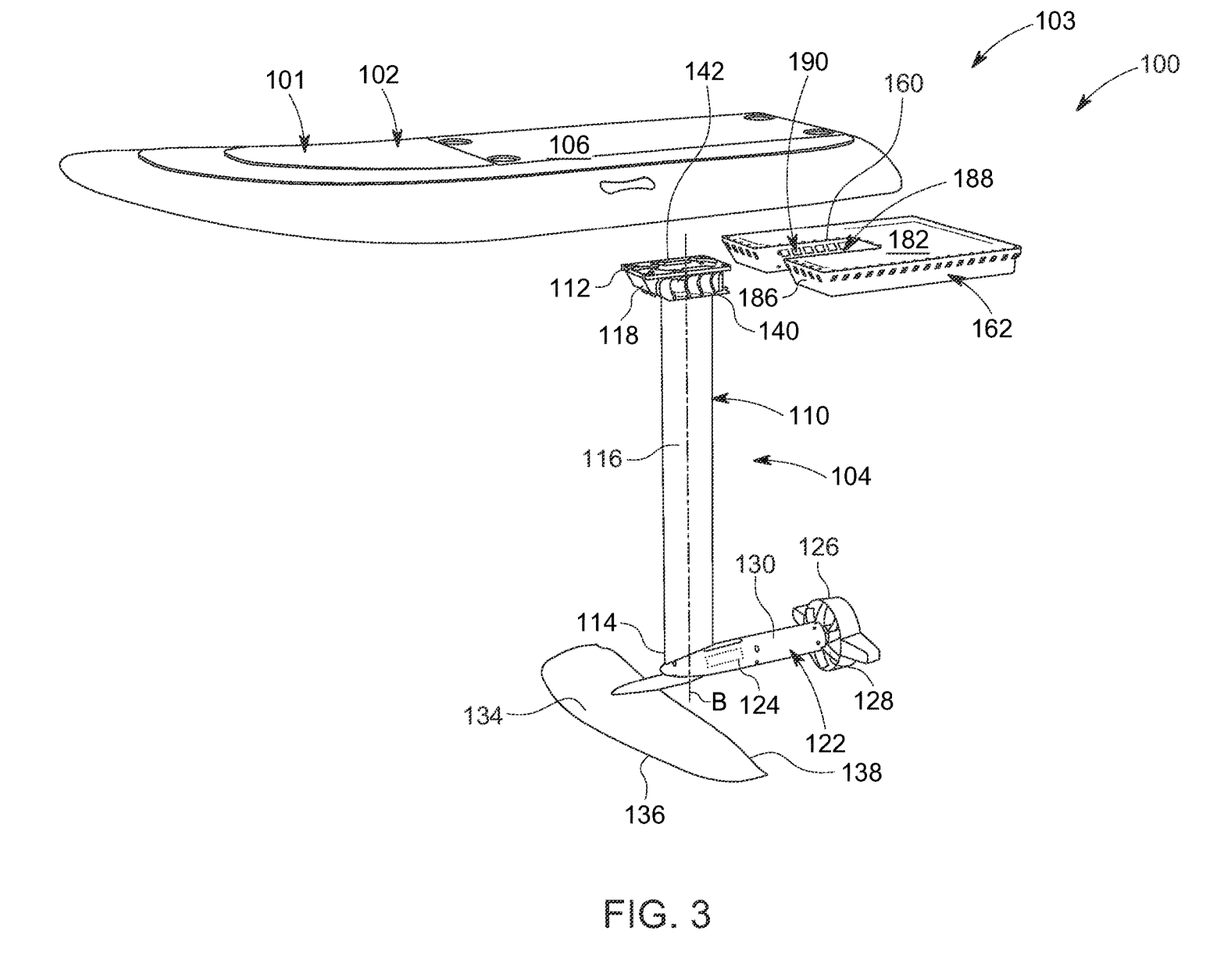
FIG. 3 illustrates an exploded view of the watercraft assembly of FIG. 1, in accordance with an embodiment of the disclosure.
Figure 4:
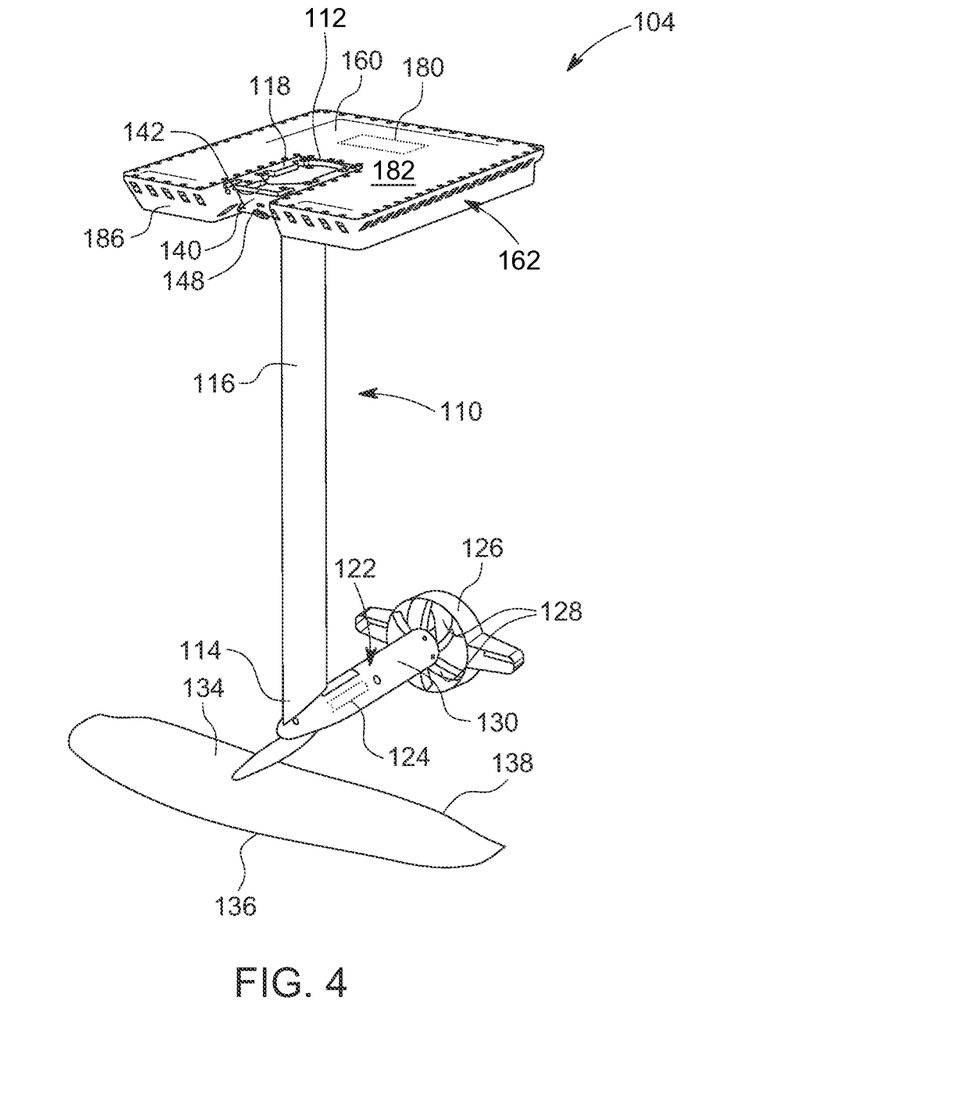
FIG. 4 illustrates a top perspective view of the hydrofoil assembly of FIG. 1, in accordance with an embodiment of the disclosure.

Referring to FIGS. 1 to 8, the hydrofoil assembly 104 includes a mast 110 having a first end 112 (i.e., upper end 112), shown in FIGS. 3 and 4) and a second end 114 (i.e., lower end 114) arranged opposite to the first end 112. The mast 110 may include a hollow elongated rod 116 defining an elongated cavity through which various electrical cables may extend, and a mast head 118 (best shown in FIG. 3) arranged at the first end of the mast 110 and engaged to the elongated rod 116. In an embodiment, the mast head 118 and the elongated rod 116 are integral to each other. Alternatively, the mast head 118 and the elongated rod 116 may be joined together by suitable coupling means known in the art. The elongated rod 116 extends from the mast head 118 to the second end 114 of the mast 110. The hydrofoil assembly 104 is removably coupled to the surfboard 102 by coupling the mast 110 (i.e., the mast head 118) with the surfboard 102 by using suitable coupling means, for example, fasteners 120. As shown in FIGS. 1, 2, 5, and 7, in the assembly of the hydrofoil assembly 104 with the surfboard 102, the hydrofoil assembly 104 (i.e., the mast head 118) is arranged outside/exterior to the surfboard 102 and underneath the surfboard 102.

The hydrofoil assembly 104 further includes a propulsion assembly 122 arranged at proximate to the second end 114 of the mast 110 and attached to elongated rod 116 of the mast 110. The propulsion assembly 122 is an electrically powered assembly having an electric motor 124, and a propeller 126 operatively coupled to the electric motor 124 and including a plurality of blades 128 adapted to rotate in response to a rotation of the electric motor 124. In an embodiment, the propeller 126 may be an open propeller, for example, a jet based propeller or a closed propeller (as shown in FIGS. 1, 3, and 4.) An axis 'A' (shown in FIG. 1) of the rotation of the blades 128 is arranged substantially perpendicularly to a longitudinal central axis 'B' (shown in FIGS. 1 and 3) of the mast 110. The propulsion assembly 122 may extend in direction substantially perpendicular to a direction of extension of the mast 110. Further, the electric motor 124 is housed inside a housing 130 that is arranged between the propeller 126 and the mast 110 and extends laterally from the mast 110. The housing 130 is attached to the elongated rod 116 and is arranged proximate to the second end 114 of the mast 110. A direction of extension of the propulsion assembly 122 is substantially parallel to a direction of the extension of the surfboard 102.

Moreover, the hydrofoil assembly 104 includes at least one wing 134 coupled to the mast 110 (i.e., elongated rod 116) and arranged proximate to the second end 114. In the illustrated embodiment, the at least one wing 134 includes a hydrofoil shape to enable a lifting of the hydrofoil assembly 104 (i.e., the surfboard 102) as the propeller 126 moves/propels the hydrofoil assembly 104 in a forward direction. In an embodiment, the at least one wing 134 may be integrally attached to the mast 110 (i.e., the elongated rod 116). Alternatively, the at least one wing 134 may be removably attached to the mast 110 using suitable couplers known in the art. Also, as shown, the at least one wing 134 extends in a lateral direction relative to the mast 110, and includes a leading edge 136 arranged proximate to the mast 110 and a trailing edge 138 disposed distally to the mast 110. As shown, the at least one wing 134 and the propulsion assembly 122 may be arranged on opposite sides of the mast 110 (i.e., elongated rod 116).

Referring to FIG. 3 to FIG. 7, the mast head 118 is removably coupled/attached with the surfboard 102 to facilitate the removable coupling of the hydrofoil assembly 104 with the surfboard 102. As shown, the mast head 118 may include a body 140 having a substantially hollow cuboidal structure with an upper surface 142 (i.e., first surface 142) that may be arranged facing the lower surface 108 of the surfboard 102 when the mast head 118 is coupled to the surfboard 102, an inner side surface defining a chamber to house one or more electrical or electronic components of the hydrofoil assembly 104, and an outer side surface 148 arranged opposite to the inner side surface. Although mast head 118 is shown to include a substantially cuboidal shape, it may be appreciated that the mast head 118 may include any other suitable shape known in the art. Further, referring to FIG. 6, the mast head 118 may include a plurality of engagement structures 150 that may be arranged proximate to a bottom surface 152 (i.e., second surface 152) of the body 140 to facilitate an engagement of the mast head 118 with a battery 162 of the hydrofoil assembly 104. As shown, in an embodiment, the plurality of engagement structures 150 includes a plurality of tabs 154 extending outwardly of the body 140 in a direction substantially laterally (i.e., perpendicularly) to the longitudinal axis 'B of the mast 110. As shown, each tab 154 includes an arm structure 156 having a first end 158 engaged/connected to the body 140 and a second end 159 arranged away and outwardly of the body 140, and a hook structure 164 arranged at the second end 159 of the body 140 and extending downwardly of the arm structure 156. The arm structure 156 may be flexible and is adapted to flex in an upward or downward direction relative to the body 140 to enable an engagement and disengagement of the tab 154 with the battery housing 160.

Figure 7:
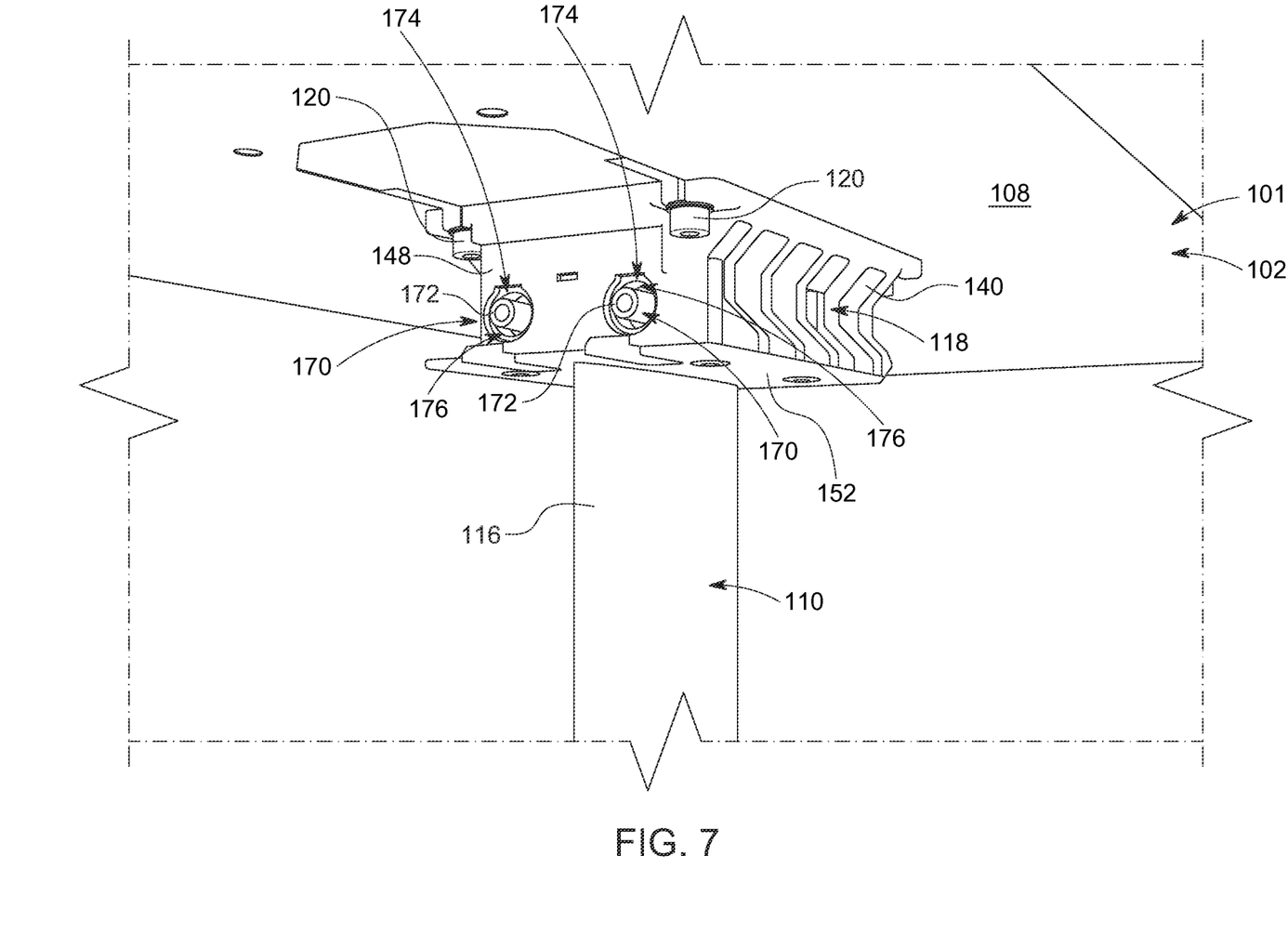
FIG. 7 illustrates a bottom perspective view of a portion of the watercraft assembly of FIG. 1 with the battery removed and depicting a plurality of connectors of the mast head, in accordance with an embodiment of the disclosure.

Additionally, referring to FIG. 7, the mast head 118 may include a plurality of connectors 170, for example, two connectors 170, to electrically couple with the battery 162. Each connector may include a socket 172 extending from an inside of the body 140 to an outside of the body 140, and extending outwardly from the outer side surface 148 of the body 140. In an embodiment, each connector 170 also includes a connector port 174 corresponding to each socket 172 and the connector socket extends through the connector port such that such that the socket 172 is arranged co-axially to the connector port 174 and a gap 176 is defined between the outer surface of the socket 172 and an inner surface of the connector port 174.

Referring to FIGS. 1 to 6, and 8, the battery 162 includes a battery housing 160 and at least one cell 180 arranged inside the battery housing 160. The battery 160 is coupled to the mast head 118 and is arranged outside and underneath the surfboard 102 in an engagement of the hydrofoil assembly 104 with the surfboard 102. In an embodiment, the battery 162 is removably coupled to the mast head 118. As shown, the battery 162 includes an upper surface 182 (i.e., first surface 182), shown in FIGS. 3, 4, and 8, adapted to be arranged facing the surfboard 102 and exterior of the surfboard 102, a lower surface 184 (i.e., second surface 184), shown in FIG. 2 and FIG. 5) arranged opposite to the upper surface 182, and at least one side surface 186 extending between the upper surface 182 and the lower surface 184. In an embodiment, the upper surface 182 is adapted to be arranged abutting the lower surface 108 of the surfboard 102 when the hydrofoil assembly 104 is coupled to the surfboard 102. Further, in an embodiment, the battery 162 is coupled to the mast head 118 such that the upper surface 182 of the battery 162 is flush with the upper surface 142 of the mast head 118 (as best shown in FIG. 4). To facilitate the engagement and the retention of the battery 162 with the mast head 118, the battery 162 may define a cut-out 188 (best shown in FIGS. 3, 5, and 8) that may extend from the upper surface 182 of the battery 162 to the lower surface 184 of the battery 162. In the illustrated embodiment, the battery housing 160 may be a horizontally oriented U-shaped housing with the cut-out 188 being a horizontally oriented U-shaped cut-out 190. In the engagement of the battery 162 with the mast head 118, the mast head 118 is arranged inside the cut-out 188.

Figure 6:
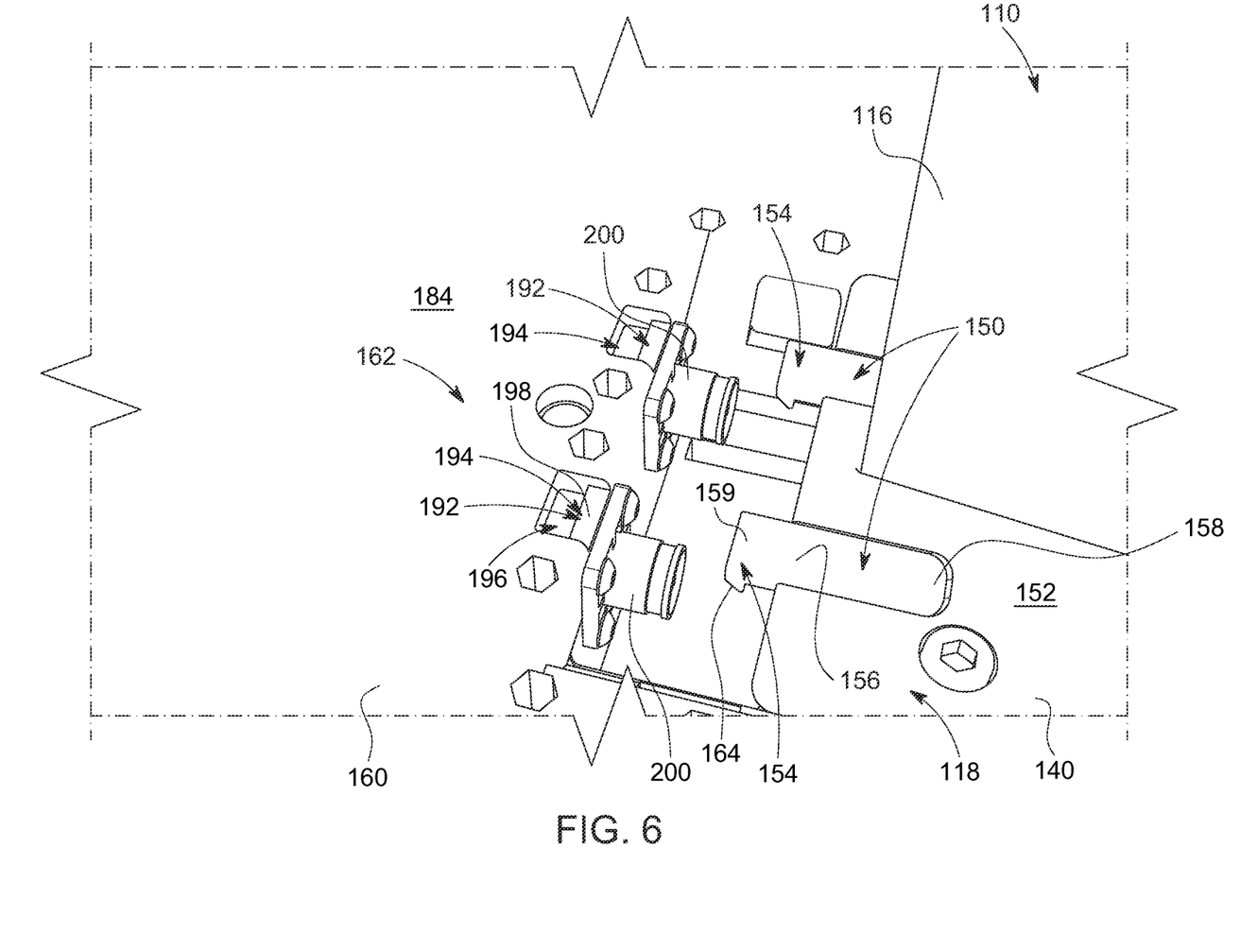
FIG. 6 illustrates a bottom view of a portion of the watercraft assembly of FIG. 1 with the battery disengaged from the mast head and depicting a plurality of engagement structures and a plurality of retention structures, in accordance with an embodiment of the disclosure.

Further, referring to FIG. 6, for engaging/coupling the battery 162 with the mast head 118, the battery 162 may include a plurality of retention structures 192 adapted to engage with the plurality of engagement structures 150 of the mast head 118. As shown, in an embodiment, each retention structure 192 may include a lock structure 194 having a recess 196 defined at the lower surface 184 of the battery 162 and a stopper structure 198. In an embodiment, in the assembly of the battery 162 with the mast head 118, the hook structure 164 of the tab 154 is arranged inside the recess 196 of the lock structure 194 such that a portion of the hook structure 164 is arranged underneath the stopper structure 198 and is engaged with the stopper structure 198. Although the tabs 154 and the lock structures 194 for engaging the mast head 118 and the battery 162 are shown and contemplated, it may be appreciated that the battery 162 and the mast head 118 may be coupled with each other via any other coupling means, for example, fasteners, known in the art, and the scope of the disclosure is not limited to the type of engagement structures 150 and the retention structures 192 disclosed in the disclosure.

Figure 8:
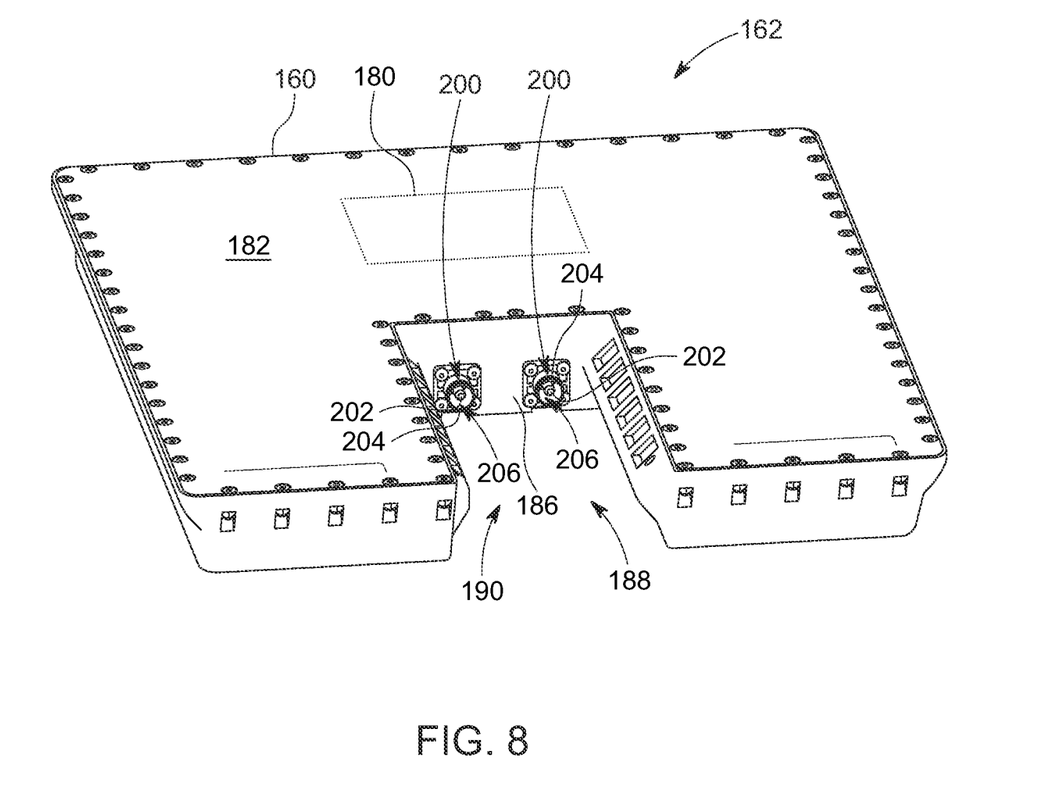
FIG. 8 illustrates a top perspective view of the battery, in accordance with an embodiment of the disclosure.

Additionally, referring to FIGS. 6 and 8, to electrically connect the battery 162 with the other electrical components of the hydrofoil assembly 104, for example, the electric motor 124, a controller, a transceiver, etc., the battery 162 may include a plurality of couplers 200 extending outwardly of the side surface 186 of the battery 162 and inside the cut-out 188. As shown in FIG. 8, each coupler 200 may include a pin 202 and a cover 204 arranged surrounding the pin 202 and extending circularly around the pin 202 defining a space 206 therebetween. The cover 204 extends along a length of the pin 202 and completely surrounds the extension of the pin 202 outside the side surface 186 of the battery 162. In the assembly of the battery 162 with the mast head 118, the pins 202 of the couplers 2002 extend inside the sockets 172 of the connector 170 of the mast head 118, and the cover 204 of each coupler 200 extends inside the gap 176 of the corresponding connectors 170. In this manner, a waterproof electrical connection is established between couplers 200 and the connectors 170. Although the couplers 200 are shown to be associated with the battery 162 and the connectors 170 are contemplated to be associated with the mast head 118, it may be envisioned that the couplers 200 may be associated with the mast head 118, and the connectors 170 may be associated with the battery 162. Also, it may be envisioned that the other types of connectors 170 and couplers 200 known in the art may also be utilized to provide the waterproof electrical connection between the mast head 118 and the battery 162.

Figure 5:
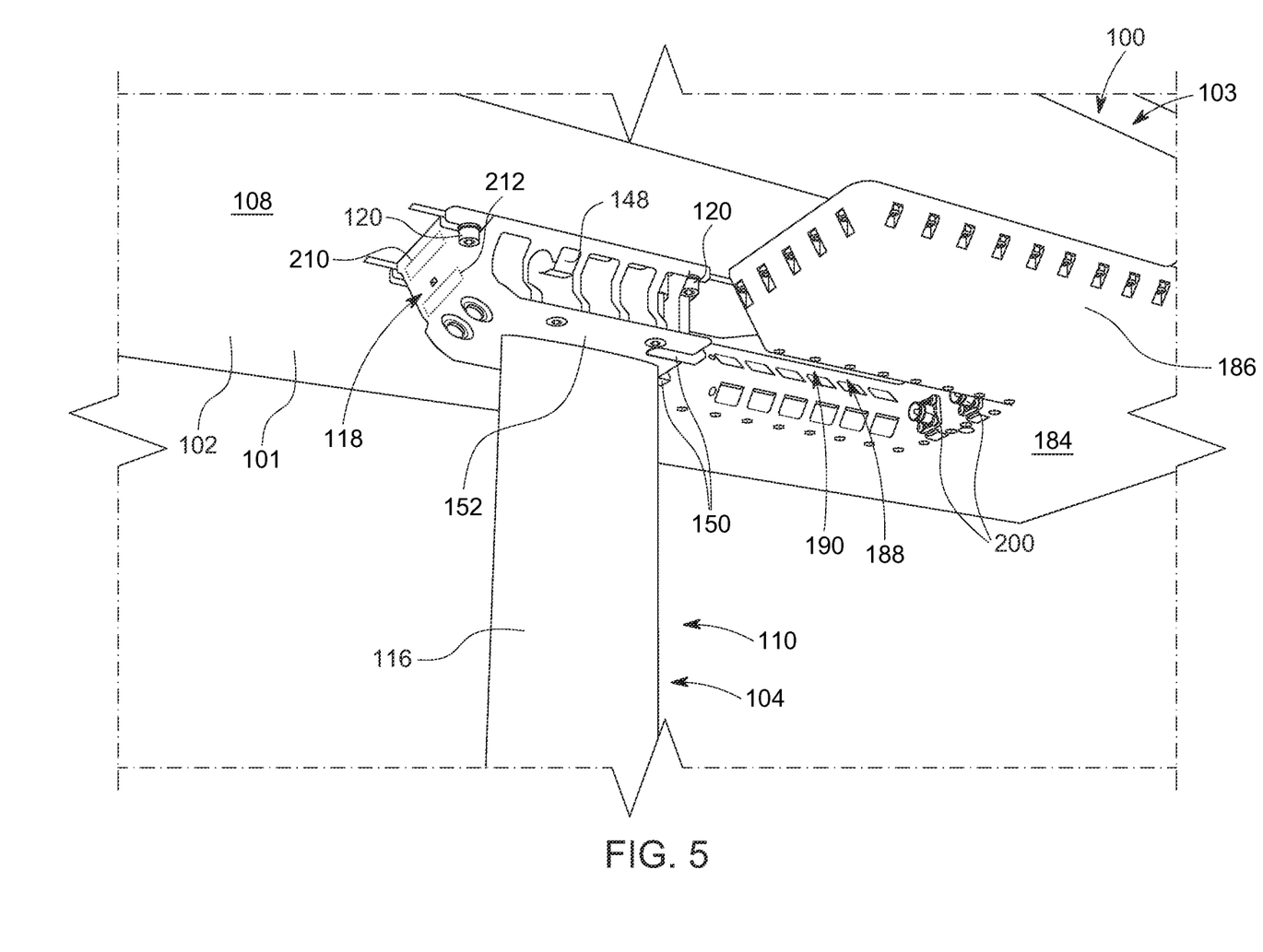
FIG. 5 illustrates a bottom perspective view of the watercraft assembly of FIG. 1 with a battery disengaged from a mast head of the hydrofoil assembly, in accordance with an embodiment of the disclosure.

Moreover, as best shown in FIG. 5, the hydrofoil assembly 102 may include a controller 210 adapted to control the operation of the electric motor 124 and other electrical components of the hydrofoil assembly 104, and hence the hydrofoil assembly 104. In an embodiment, the controller 210 may control a speed of rotation of the electric motor 124 based on the inputs from a user. In an embodiment, the inputs may be received from a remote location via a remote input device. For enabling the receipt of the inputs from the remote input device, the hydrofoil assembly 104 may include a transceiver 212 communicably coupled to the controller 210. In an embodiment, both the controller 210 and the transceiver 212 may be arranged inside the mast head 118 or the elongated rod 116 of the mast 110 or the housing 130 of the electric motor 124. In an embodiment, the controller 210 and/or the transceiver 212 may operate/communicate with the external remote input device at sub gigahertz frequency to facilitate the communication when the hydrofoil assembly 104 is underwater. The hydrofoil assembly 104 may be attached to any exiting standard surfboard to electrically power the surfboard.

Figure 9:
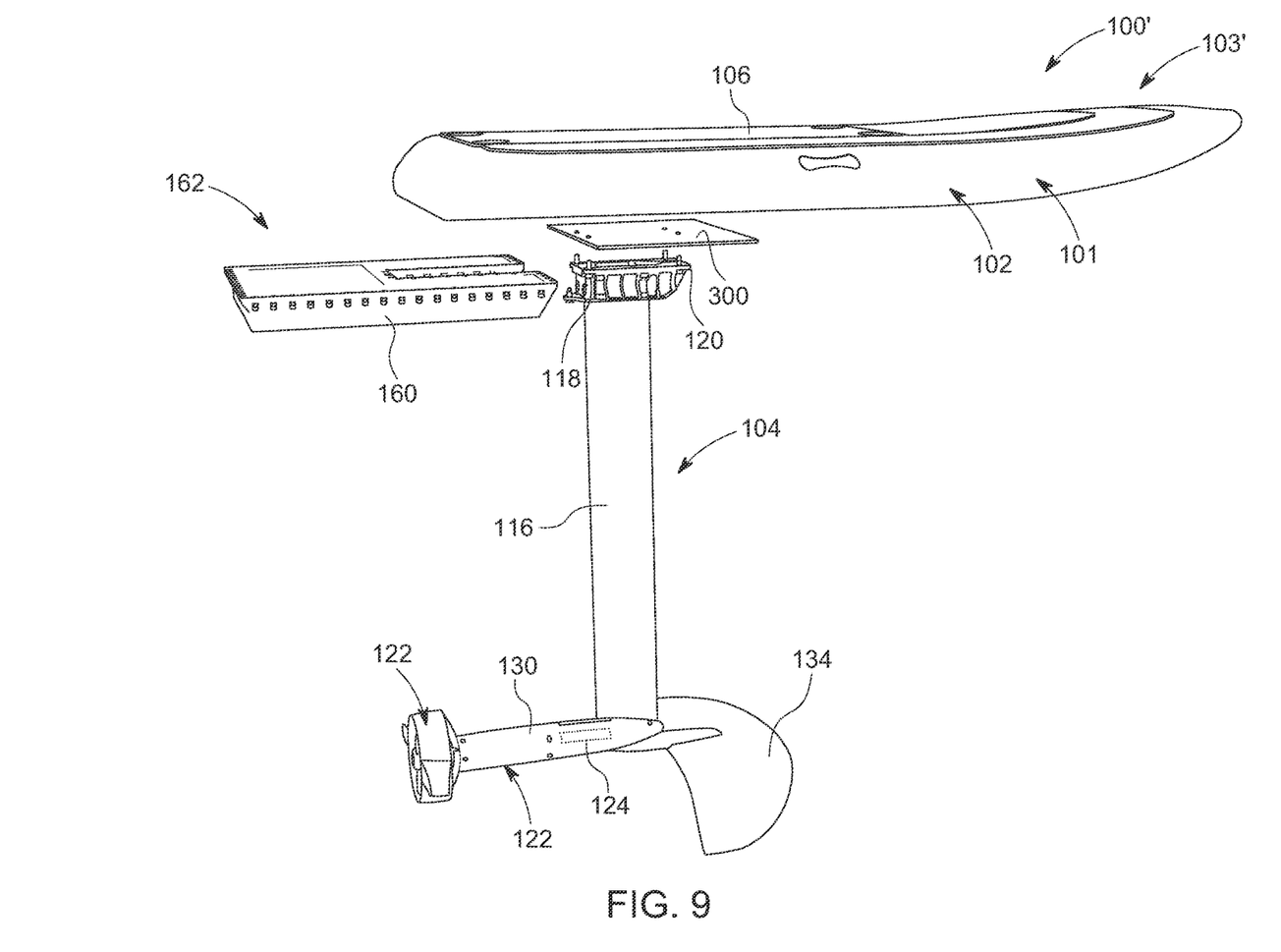
FIG. 9 illustrates a perspective view of a watercraft assembly, in accordance with an embodiment of the disclosure.

Referring to FIG. 9, a watercraft assembly 100' (i.e., surfboard assembly 103'), is shown according to an embodiment of the disclosure. The surfboard assembly 103' is identical to the surfboard assembly 103 except the surfboard assembly 103' includes a mounting plate 300 adapted to attach or couple the hydrofoil assembly 104 to the surfboard 102. For so doing, the mounting plate 300 is attached to the second surface 108 of the surfboard and then the hydrofoil assembly 104 is engaged/coupled with the mounting plate 300 by coupling/attaching/engaging the mast head 118 with the mounting plate 300 using suitable coupling means, for example, fasteners.

Figure 10:
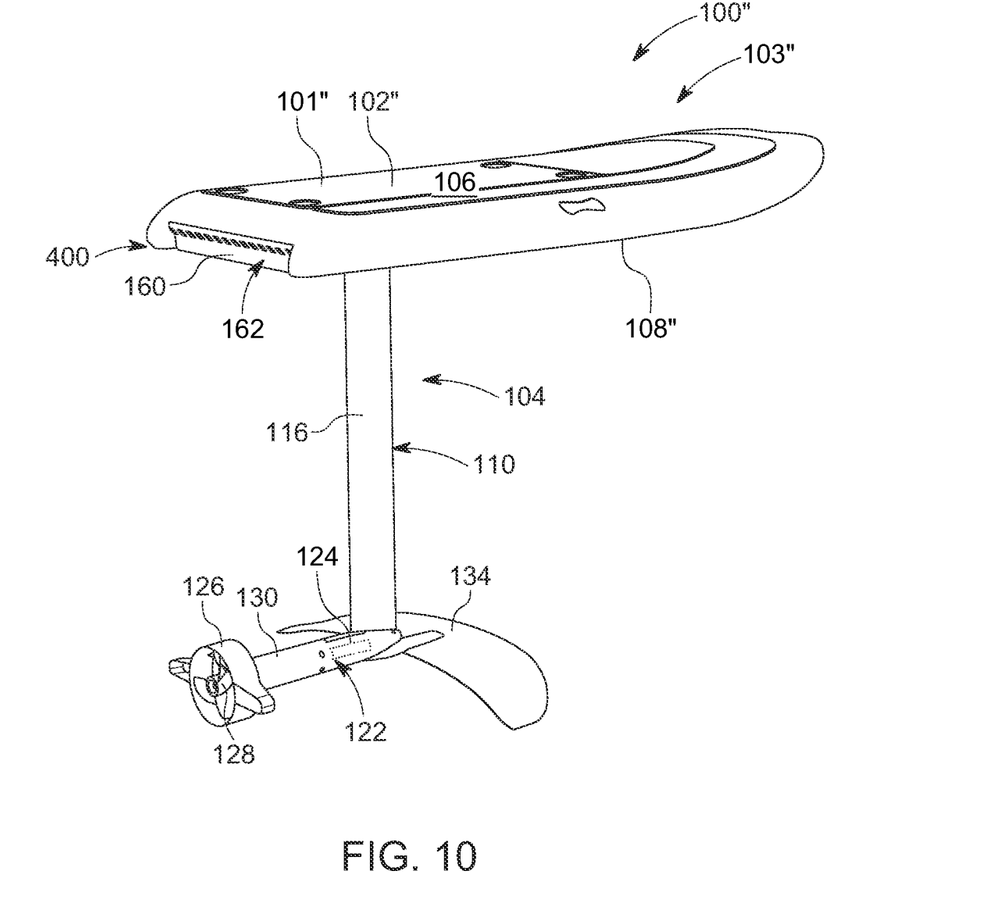
FIG. 10 illustrates a perspective view of a watercraft assembly, in accordance with an embodiment of the disclosure.

Referring to FIG. 10, a watercraft assembly 100" i.e., a surfboard assembly 103", is shown according to an embodiment of the disclosure. The surfboard assembly 103" is identical to the surfboard assembly 103 except that a surfboard 102" of the surfboard assembly 103" is different from the surfboard 102 in the aspect that a second surface 108" of the surfboard 102" defines a depression 400 and the hydrofoil assembly 104 is engaged with the surfboard 102" such that the battery 162 is arranged inside the depression 400 and the lower surface 184 of the battery 162 is flush with the second surface 108" of the surfboard 102".

It should be understood that the foregoing description is only illustrative of the aspects of the disclosed embodiments. Various alternatives and modifications can be devised by those skilled in the art without departing from the aspects of the disclosed embodiments. Accordingly, the aspects of the disclosed embodiments are intended to embrace all such alternatives, modifications, and variances that fall within the scope of the appended specification.

What is claimed is:

1. A hydrofoil assembly configured to be attached to a personal watercraft, the hydrofoil assembly comprising:
a mast comprising a mast head configured to be removably engage with the personal watercraft and disposed exterior to the personal watercraft;
a propulsion assembly coupled to the mast and comprising a propeller and an electric motor operatively coupled to the propeller for rotating the propeller;
at least one wing coupled to the mast and arranged distally from the mast head; and
a battery disposed exterior of the mast head and configured to be arranged exterior of the personal watercraft in an assembly of the mast head with the personal watercraft, wherein the battery is coupled to and supported on the mast head and provides electric power to the electric motor.

2. The hydrofoil assembly of claim 1, wherein
the mast head comprises a plurality of engagement structures, and
the battery comprises a plurality of retention structures removably engaged with the plurality of engagement structures to facilitate a removable coupling of the battery and the mast head.

3. The hydrofoil assembly of claim 2, wherein
each engagement structure comprises a tab extending outwardly from a side surface of the mast head, and
each retention structure comprises a lock structure to receive the tab and lock the tab with the battery.

4. The hydrofoil assembly of claim 3, wherein the tab comprises
an arm structure comprising a first end engaged to the mast head and a second end disposed outwardly of the side surface of the mast head, and
a hook structure arranged at the second end of the arm structure.

5. The hydrofoil assembly of claim 4, wherein the lock structure comprises
a recess defined by a second surface of the battery, and a stopper structure covering a portion of the recess, wherein
in the engagement of the tab with the lock structure, the hook structure is arranged inside the recess and engaged with the stopper structure such that a portion of the hook structure is arranged underneath the stopper structure.

6. The hydrofoil assembly of claim 1, wherein
the mast head comprises a plurality of connectors, and
the battery comprises a plurality of couplers configured to engage with the plurality of connectors to electrically couple the battery with the electric motor.

7. The hydrofoil assembly of claim 6, wherein each connector comprises a connector port and a socket extending through the connector port and arranged coaxially with the connector port defining a gap therebetween.

8. The hydrofoil assembly of claim 7, wherein each coupler comprises a pin extending outwardly of the battery and a cover arranged circularly around the pin defining a space therebetween, wherein the pin extends inside the socket and the cover is arranged inside the gap in an assembly of the battery with the mast head.

9. The hydrofoil assembly of claim 1, wherein the battery defines a cut-out extending from the first surface of the battery to a second surface of the battery arranged opposite to the first surface of the battery, and the mast head is arranged, at least partially, inside the cut-out.

10. The hydrofoil assembly of claim 1 further comprising a controller configured to control the electric motor, and a transceiver configured to facilitate a communication of the controller with a remote input device at a sub gigahertz frequency.

11. A watercraft assembly, comprising:
a personal watercraft comprising a first surface configured to support at least one user and a second surface arranged opposite to the first surface; and
a hydrofoil assembly removably engaged to the personal watercraft and arranged exterior to and underneath the personal watercraft, the hydrofoil assembly comprising
a mast comprising a mast head removably engaged with the personal watercraft and disposed exterior to the personal watercraft, the mast head comprising a first surface arranged facing the personal watercraft,
a propulsion assembly coupled to the mast and comprising a propeller and an electric motor operatively coupled to the propeller for rotating the propeller,
at least one wing coupled to the mast and arranged distally from the mast head, and
a battery coupled to the mast head and supported on the mast head, the battery is arranged exterior to the personal watercraft, and provides electric power to the electric motor.

12. The watercraft assembly of claim 11, wherein
the mast head comprises a second surface arranged opposite to the first surface of the mast head, and the battery is engaged with the mast head such that a first surface of the battery
is arranged flush with the first surface of the mast head.

13. The watercraft assembly of claim 11, wherein
the mast head comprises a plurality of engagement structures, and
the battery comprises a plurality of retention structures removably engaged with the plurality of engagement structures to facilitate a removable coupling of the battery and the mast head.

14. The watercraft assembly of claim 13, wherein
each engagement structure comprises a tab extending outwardly from a side surface of the mast head, and
each retention structure comprises a lock structure to receive the tab and lock the tab with the battery.

15. The watercraft assembly of claim 14, wherein
the tab comprises an arm structure extending outwardly from the mast head and a hook structure extending from the arm structure, and
the lock structure comprises a recess defined by a second surface of the battery and a stopper structure covering a portion of the recess,
wherein
in the engagement of the tab with the lock structure, the hook structure is arranged inside the recess and engaged with the stopper structure such that a portion of the hook structure is arranged underneath the stopper structure.

16. The watercraft assembly of claim 11, wherein
the mast head comprises a plurality of connectors, and
the battery comprises a plurality of couplers configured to engage with the plurality of connectors to electrically couple the battery with the electric motor.

17. The watercraft assembly of claim 16, wherein each connector comprises a connector port and a socket extending through the connector port and arranged coaxially with the connector port defining a gap therebetween.

18. The watercraft assembly of claim 17, wherein each coupler comprises a pin extending outwardly of the battery and a cover arranged circularly around the pin defining a space therebetween, wherein the pin extends inside the socket and the cover is arranged inside the gap in an assembly of the battery with the mast head.

19. The watercraft assembly of claim 11, wherein the battery comprises a first surface and a second surface arranged opposite to the first surface, wherein the battery defines a cut-out extending from the first surface of the battery to the second surface of the battery, and the mast head is arranged, at least partially, inside the cut-out.

20. The watercraft assembly of claim 11, wherein the hydrofoil assembly comprises a controller configured to control the electric motor, and a transceiver configured to facilitate a communication of the controller with a remote input device at a sub gigahertz frequency.

\* \* \* \* \*